INVENTOR.
*Francis A. Fekete*
BY *Henry J. Mansell*
*John P. Moco*
*Barthel + Bugbee Attys*

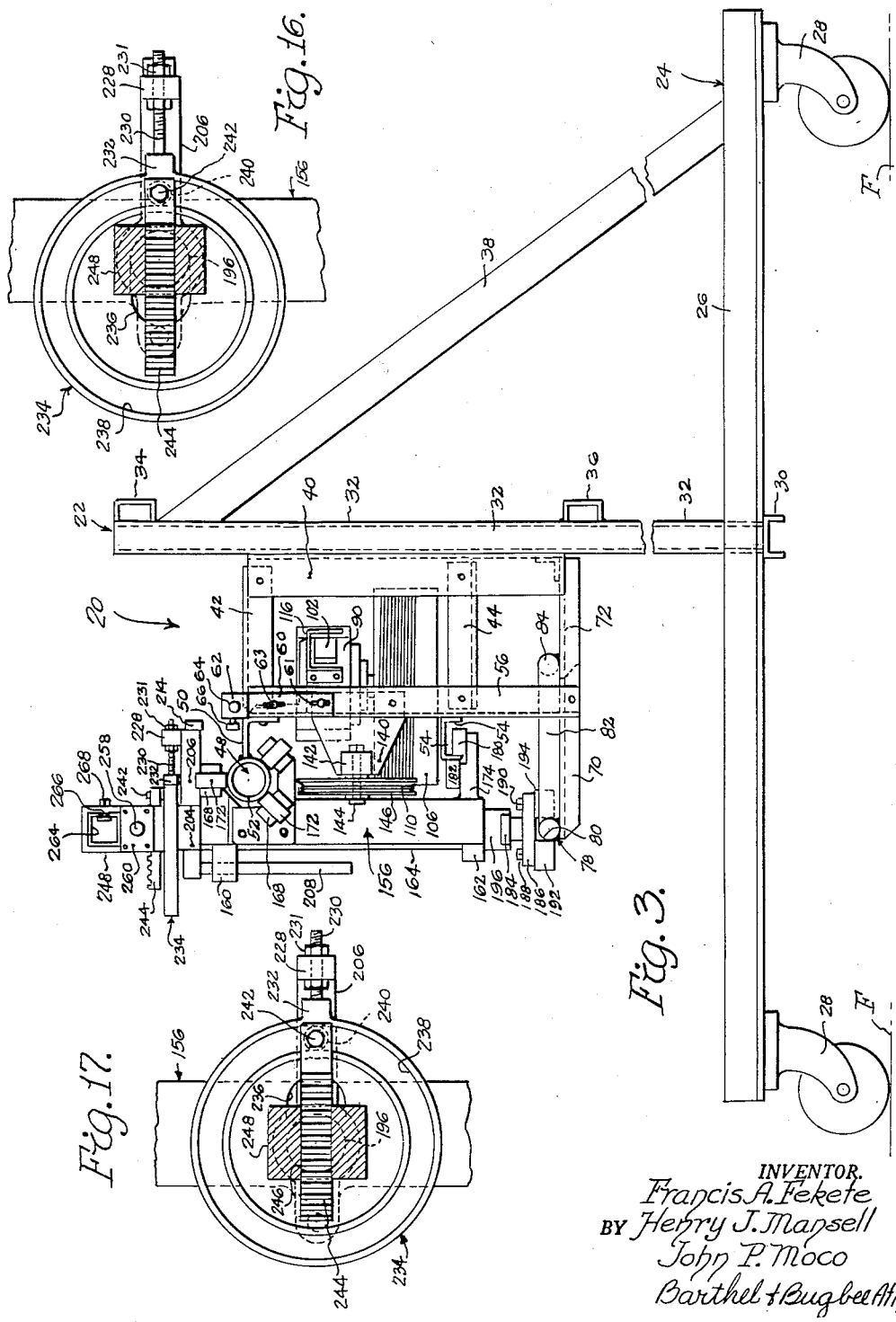

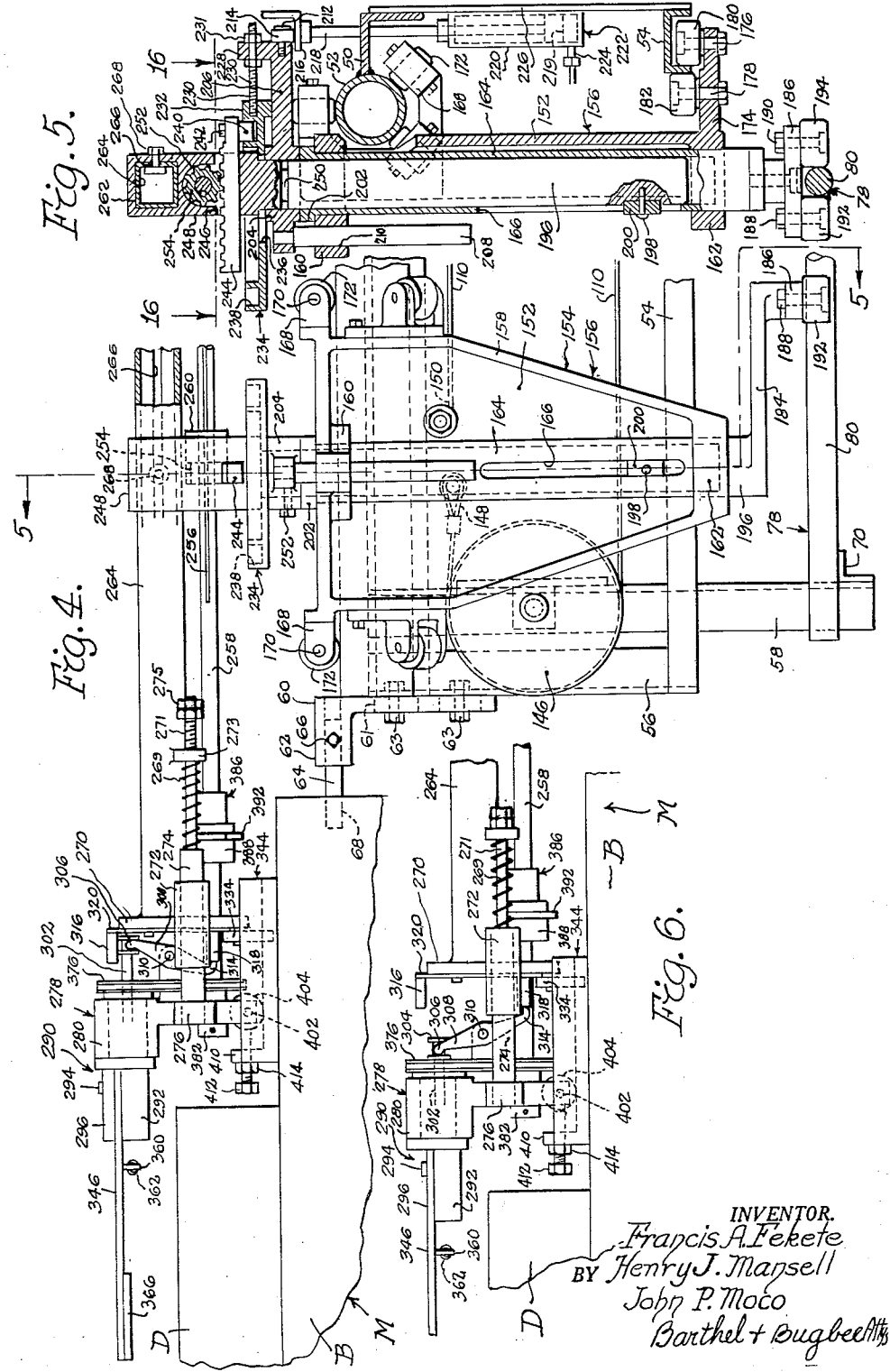

Sept. 26, 1961  F. A. FEKETE ET AL  3,001,651
WORK TRANSFER APPARATUS
Filed July 26, 1957  4 Sheets-Sheet 4
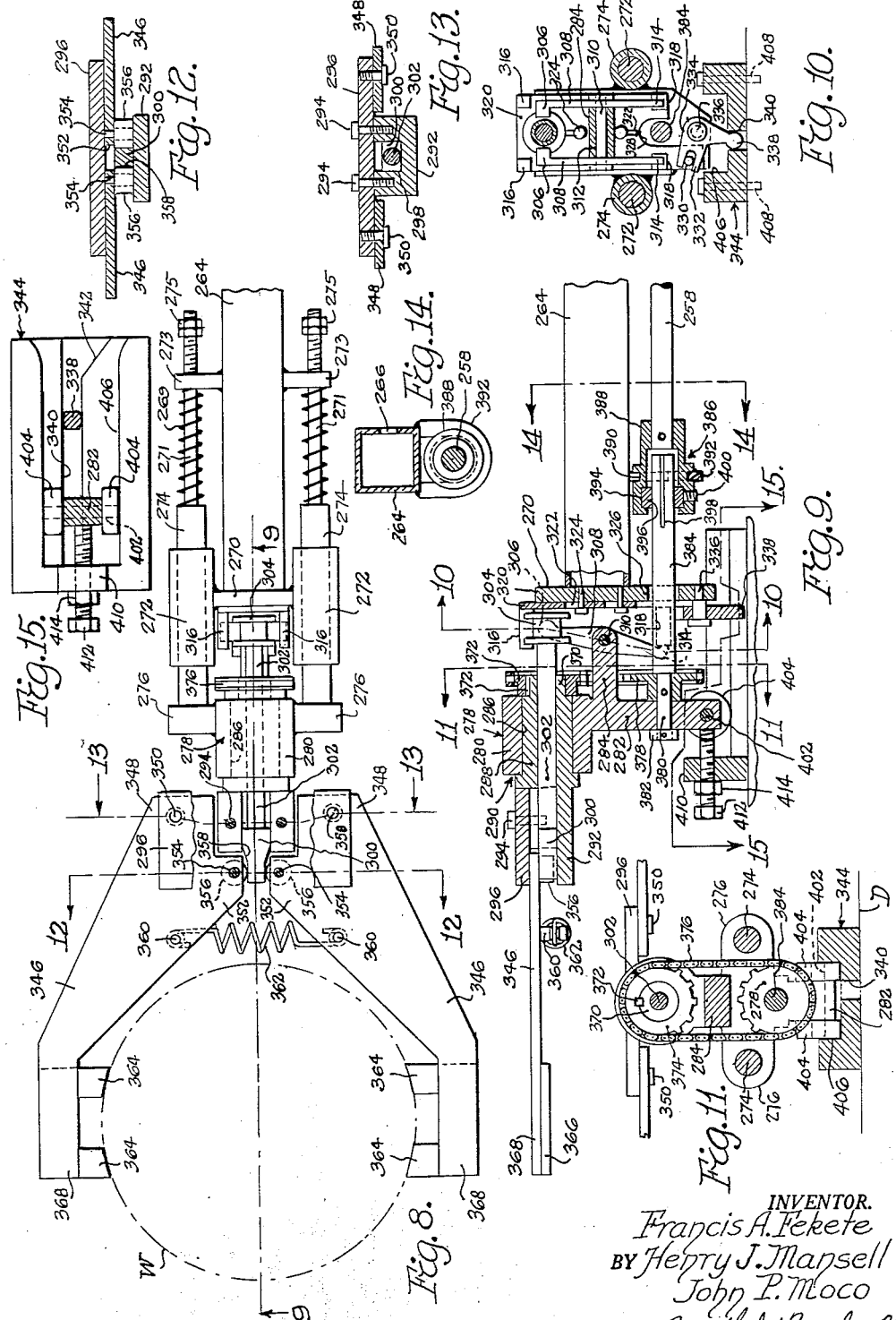
INVENTOR.
Francis A. Fekete
BY Henry J. Mansell
John P. Moco
Barthel + Bugbee Attys United States Patent Office 3,001,651
Patented Sept. 26, 1961

3,001,651
WORK TRANSFER APPARATUS
Francis A. Fekete, Detroit, Henry J. Mansell, Davison, and John P. Moco, River Rouge, Mich., assignors to Moco Industrial Equipment, Inc., Melvindale, Mich., a corporation of Michigan
Filed July 26, 1957, Ser. No. 674,379
4 Claims. (Cl. 214—1)

This invention relates to automation equipment and, in particular, to work transfer apparatus for transferring workpieces from one machine to another between successive operations performed by the machines upon each workpiece.

Hitherto, workpieces, such as stampings from stamping presses, have been frequently produced by successive operations performed by a succession of machines, the workpieces having been removed manually from one machine and transferred to and inserted in the next successive machine by manual operations. The provision of ejection devices for ejecting workpieces from the dies, and the arrangement of conveying apparatus for carrying the workpieces from machine to machine has eliminated a part of the manual transfer of workpieces, but the task of transferring the ejected work-piece from the press to the conveyor and from the conveyor to the die set in the next machine have remained manual operations.

The present invention provides a work transfer apparatus which not only removes the ejected article from the die cavity or die set of one machine but also transfers it bodily between machines and inserts it precisely in the die cavity or die set of the next successive machine, at the same time, if necessary, lifting the workpiece to enable it to clear the die cavities or die sets and also, if necessary, partially or completely inverting the workpiece while it is being transferred from machine to machine.

Accordingly, one object of the present invention is to provide a work transfer apparatus which grasps a workpiece after it has been processed in a previous machine, transfers it through the space between successive machines, and re-inserts it precisely in the following machine, ready to be processed by that machine, without the necessity for any handling of the workpiece by the operator of the machines.

Another object is to provide a work transfer apparatus of the foregoing character wherein the gripping of the workpiece at the previous machine and its release at the following machine are accomplished automatically without the requirement for attention thereto on the part of the machine operator.

Another object is to provide a work transfer apparatus of the foregoing character, wherein means is also provided for lifting the workpiece while removing it from the previous machine, with or without lowering it into a predetermined position in the following machine.

Another object is to provide a work transfer apparatus of the foregoing character wherein means is also provided for partially or completely inverting the workpiece while transferring it from machine to machine, this inverting means being capable of being placed in or out of operation as the character of the machining operations demand.

Another object is to provide a work transfer apparatus of the foregoing character wherein precise means is provided for accurately positioning the work transfer device between successive machines and aligning it at its opposite ends by a positive locating connection with each machine.

Another object is to provide a work transfer apparatus of the foregoing character wherein the workpiece is grasped by automatically-actuated gripping jaws at the previous machine, conveyed by a carriage carrying the jaws along a guide track to the following machine, and at the same time swung through approximately a half revolution to present the workpiece properly to the die set or other machining tool in the following machine.

Another object is to provide a work transfer apparatus of the foregoing character which is portable and thereby capable of being moved from machine to machine in order to permit easy removal of dies from the machines or to relocate the apparatus when the production set-up is being altered.

Another object is to provide a work transfer apparatus of the foregoing character wherein the main or central portion of the apparatus remains substantially unchanged in its adaptation to work transfer between different types of machines and wherein such adaptation is made by suitable alterations in the opposite end portions of the apparatus.

Another object is to provide a work transfer apparatus, as set forth in the object immediately preceding, wherein the apparatus is quickly and easily adapted to different separations of machines without requiring fundamental changes in the main portion of the apparatus.

Another object is to provide a work transfer apparatus of the foregoing character wherein all the major motive actions of the apparatus are powered by a single reciprocatory fluid pressure motor, such as an air-operated cylinder and piston, in cooperation with certain cams.

Other objects and advantages of the invention will become apparent during the course of the following description of the accompanying drawings, wherein:

FIGURE 3 is a right-hand end elevation, upon an enlarged scale, of the apparatus shown in FIGURES 1 and 2;

FIGURE 4 is an enlarged fragmentary front elevation of the work gripping jaws and carriage and adjacent structure at the extreme left-hand end of FIGURE 2, with the work-gripping jaws closed;

FIGURE 5 is a vertical cross-section taken along the line 5—5 in FIGURE 4;

FIGURE 6 is a fragmentary front elevation of the upper left-hand corner of FIGURE 4, showing the positions of the parts with the work-gripping jaws open;

FIGURE 8 is a top plan view, upon an enlarged scale, of the work gripping portion of the apparatus, shown in front elevation in the upper left-hand corner of FIGURE 4, with the gripping jaws closed upon a workpiece indicated in chain lines;

FIGURE 9 is a central vertical section taken along the line 9—9 in FIGURE 8;

FIGURE 10 is a vertical cross-section taken along the line 10—10 in FIGURE 9, showing details of the gripping jaw operating mechanism;

FIGURE 11 is a vertical cross-section taken along the line 11—11 in FIGURE 9, showing the optionally-operable work-inverting mechanism of the apparatus;

FIGURE 12 is a cross-section taken along the line 12—12 in FIGURE 8;

FIGURE 13 is a cross-section taken along the line 13—13 in FIGURE 8;

FIGURE 14 is a cross-section taken along the line 14—14 in FIGURE 9;

FIGURE 15 is a horizontal section taken along the line 15—15 in FIGURE 9;

FIGURE 16 is a horizontal section taken along the line 16—16 in FIGURE 5, showing details of the work-inverting mechanism, with the annular operating cam thereof in its decentered or operative position; and FIGURE 17 is a view similar to FIGURE 16, but with the annular operating cam shifted to its inoperative or non-inverting position.

Supporting and guiding structure

Figure 1:
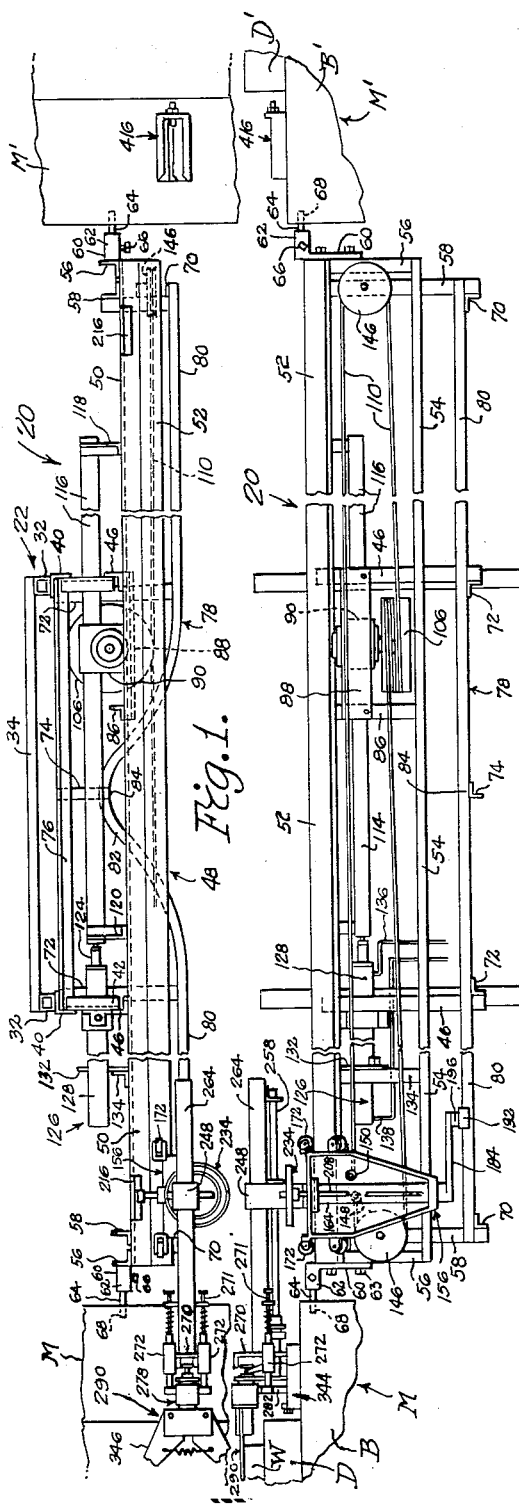
FIGURE 1 is a top plan view of a work transfer apparatus, according to one form of the invention, as arranged between successive machines for transfer of workpieces therebetween.
Figure 2:
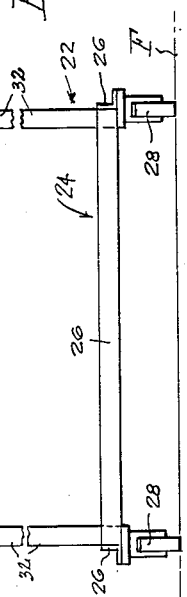
FIGURE 2 is a front elevation of the apparatus shown in FIGURE 1, together with the successive machines between which it is arranged.

Referring to the drawings in detail, FIGURES 1 and 2 show, on a reduced scale, and FIGURE 3 on an enlarged scale, a work transfer apparatus, generally designated 20, according to one form of the invention as mounted on the floor F between a pair of metalworking machines M and M'. For purposes of illustration, but not limitation, the machines M and M' are shown fragmentarily as the bed portions of stamping presses arranged to perform successive stamping operations on workpieces W (FIGURE 8). The machines M and M' are provided with die sets for performing successive operations upon the workpieces W, only the lower die members D and D' of the die set of the machines M and M' being shown in FIGURE 2, but omitted from FIGURE 1 to avoid confusion. The die members D and D' are mounted upon the beds B and B' of the machines M and M'.

The apparatus 20 is mounted for portability upon a chassis frame, generally designated 22 (FIGURES 2 and 3) by means of which it can be moved into and out of position between successive machines M and M' for the purpose of changing dies, machine maintenance or repair, or other necessary purposes. The chassis frame 22 consists of an open rectangular base frame 24 of angle members 26 having swivel casters 28 mounted at its opposite corners. Extending between opposite sides of the base frame 24 near the approximate center thereof is an inverted channel member 30 secured as by welding to the underside of the base frame 24. Rising from the cross member 30 and base frame 24 and secured to the angle members 26 thereof are two spaced parallel hollow uprights 32 of rectangular cross-section (FIGURE 1) interconnected at their tops and near their bottoms by upper and lower longitudinal channel members 34 and 36 respectively, inclined braces 38 being also provided (FIGURE 3) to strengthen the construction and to connect the base frame 24 with the uprights 32.

Secured as by bolts (not shown) for vertical adjustment relatively to the hollow uprights 32 are vertically-slotted parallel vertical angle members 40 (FIGURES 1 and 3). Extending horizontally forward from the vertical angle members 40 are parallel horizontal upper and lower angle members 42 and 44 respectively (FIGURES 1 and 3). Secured to the forward or outer ends of the upper and lower angle members 42 and 44 are forward intermediate vertical angle members 46 (FIGURES 1 and 2). Bolted or otherwise secured to the upper ends of the intermediate vertical angle members 46 is a guide track structure, generally designated 48, consisting of a horizontal angle member 50 to the forward edge of which is welded a hollow tubular guide rail 52. The guide track structure 48 is of much greater length than the separation of the uprights 32 (FIGURE 2) and also serves as a backbone or horizontal longitudinal structural beam. Spaced below and parallel to the guide track structure 48 and likewise secured to the vertical forward angle members 46 is an elongated inverted channel guide member 54 (FIGURES 2 and 3) which occupies a position intermediate the upper and lower ends of the vertical angle members 46. The channel guide member 54 is approximately the same length as the guide track structure 48 and is connected thereto at its opposite ends by oppositely-facing but adjacent vertical paired short and long angle members 56 and 58 respectively.

The shorter outer end angle members 56 carry angle brackets 60 (FIGURES 1 to 4) slotted vertically as at 61 so as to be adjustably bolted thereto as at 63 and provided at their upper ends with hollow bosses 62 in which locating pins 64 are secured as by the set screws 66. The locating pins 64 are so positioned as to enter correspondingly-positioned locating sockets 68 in the side portions of the machines M and M'. Extending forwardly from the longer or inner end vertical angle members 58 (FIGURES 1 and 2) are horizontal end angle members 70, and similarly extending forwardly from the vertical angle members 40 and 46 are intermediate horizontal angle members 72, between which is a central horizontal forwardly-extending angle member 74 secured at its rearward end to a longitudinal lower angle member 76 which in turn is secured at its opposite ends to the rearward vertical angle members 40. Secured to the forward ends of the forwardly-extending angle members 70, 72 is an undulatory cam bar 78 of circular cross-section having rectilinear end portions 80 aligned with one another and a hump or horizontal undulatory portion 82 secured at its peak 84 (FIGURE 1) to the central angle member 74. The undulatory cam bar 78, as will appear below, serves the purpose of swinging the workpiece holding mechanism through a semi-circular horizontal path between the machines M and M'.

Carriage-propelling mechanism

Figure 7:
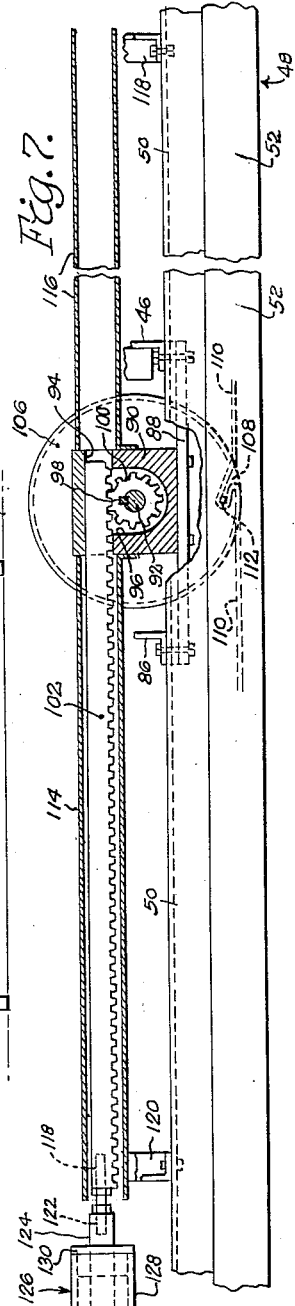
FIGURE 7 is an enlarged fragmentary horizontal section through the motion-multiplying mechanism between the motive piston and the cable drum shown in the central portions of FIGURES 1, 2 and 3.

Secured to and extending between the angle member 50 of the guide track structure 48 and the inverted channel guide member 54 is a vertical inner angle member 86, and bolted or otherwise secured to the angle member 86 and the right-hand vertical angle member 46 is a mounting plate 88 (FIGURES 2 and 7) disposed in a substantially vertical plane. Bolted or otherwise secured to the mounting plate 88 is a vertical gear box 90 (FIGURE 7) having a vertical shaft 92 journaled in the upper and lower ends thereof and having a horizontal bore 94 communicating with a horizontal recess 96 of approximately semi-circular cross-section. Keyed as at 98 to the vertical shaft 92 is a pinion 100 mounted in the recess 96 and meshing with a rack bar 102 passing through and guided by the bore 94. Also keyed or otherwise drivingly secured to the lower end of the vertical shaft 92 is a cable drum 106 (FIGURES 2, 3 and 7) having in the periphery thereof a cable-receiving notch 108 in which a carriage-propelling cable 110 is secured, as by the fastener 112 (FIGURE 7).

Secured to the gear box 90 at opposite ends of the bore 94 are aligned inverted channel-shaped rack bar guards 114 and 116 respectively (FIGURE 7) supported by struts 118 an 120 bolted to the angle member 50 of the guide track structure 48. The rack bar guards 114 and 116 are superimposed upon the rack bar 102 to shield the latter, whereas the rack bar 102 at its left-hand end (FIGURE 7) is bored and threaded as at 118 to receive one end of a threaded stud, the opposite end of which is similarly threaded into a threaded bore 122 in the outer end of the compressed-air-operated piston rod 124 of a horizontal reciprocatory fluid pressure motor, generally designated 126. The motor 126 is provided with a cylinder 128 in which reciprocates the piston head (not shown) connected to the piston rod 124, the latter passing outward through a cylinder head 130 which closes the right-hand end of the cylinder 128.

The cylinder 128 is supported near its rearward or left-hand end by a bracket plate 132 secured to a vertical angle member 134 which in turn is secured at its upper and lower ends to the angle member 50 and inverted channel member 54 respectively. Connected to the opposite ends of the cylinder 128 (FIGURE 2) are fluid service pipes 136 and 138 respectively. The forward portion of the air cylinder 128 is secured to and supported by the left-hand vertical angle member 46. Bolted or otherwise secured to the inner vertical angle members 58 are brackets 140 (FIGURE 3) having bosses 142 which are drilled to receive axle bolts 144 of grooved idler pulleys 146, around which the opposite end courses of the cable 110 are trained (FIGURE 2). The cable 110 is not endless, but has several turns wound around the cable drum 106 and has opposite end loops 148 and 150 respectively.

Work-carrying carriage

The cable end loops 148 and 150 are anchored to the rear web 152 of a carriage frame member 154 of a work carrying carriage, generally designated 156. The carriage frame member 154 is of roughly triangular shape (FIGURE 4) and surrounded by a peripheral strengthening rib 158 which terminates at the upper and lower ends of the casting 154 in bearing bosses 106 and 162 bored to receive a tubular vertical shaft 164 (FIGURE 5) provided with an elongated vertical slot 166.

The carriage frame casting 154 is provided near the upper ends of its opposite sides with horizontally-projecting pairs of ears or yokes 168 in which are journaled the axles 170 of rollers 172 disposed at 120° intervals around the tubular guide rail 52 and bearing thereagainst (FIGURE 5). Projecting horizontally rearward from the lower bearing boss 162 is an arm 174 (FIGURE 5) drilled at spaced intervals to receive axle bolts 176 and 178 of spaced staggered rollers 180 and 182 arranged respectively to engage the external and internal surfaces of one of the side flanges of the inverted channel guide member 54. The carriage 156 is thus rollably supported for horizontal reciprocation along the tubular guide rail 52 and channel guide track 54 by the upper rollers 170 and lower rollers 180 and 182 and maintained thereby in a substantially vertical position.

Integral with the lower end of the tubular shaft 164 is a crank arm 184 (FIGURE 4), the outer end of which is provided with a T-shaped portion 186 drilled at spaced intervals to receive the axle bolts 188 and 190 (FIGURE 3) of outer and inner contact rollers 192 and 194 respectively engageable with the diametrically-opposite sides of the undulatory cam bar 78. Rotatably mounted within the tubular shaft 164 is an inner solid shaft 196 drilled and threaded to receive a screw or other fastener 198 and recessed to receive a key block 200 secured thereto by the fastener 198 (FIGURE 5). The key block 200 slidably engages the elongated slot 166 as the inner shaft 196 is raised or lowered by means subsequently to be described, while maintaining a driving connection with the outer tubular shaft 164.

The upper end of the outer tubular shaft 164 is flanged as at 202 where it rests upon the upper side of the bearing boss 160 and in turn has resting upon it the hub 204 of a bracket 206 drilled on one side to receive the upper reduced diameter end of a guide rod 208 passing through a bore 210 in the front of the bearing boss 160 to prevent relative rotation therebetween. The bracket 206 projects rearwardly and at its rearward end is drilled and threaded to receive the axle bolt 212 of a roller 214 engageable with a short piece of angle track or stub track 216 mounted on the upper end of a piston rod 218, the lower end of which is connected to a piston head 219 reciprocable in the cylinder 220 of a single-acting reciprocatory fluid pressure motor 222 having at its lower end a service pipe 224 adapted to be connected to a suitable source of compressed air (not shown). The cylinder 220 is secured to a vertical plate 226, the upper and lower ends of which are secured respectively to the angle member 50 and channel member 54 (FIGURE 5). Thus, by supplying pressure fluid to the pipe connection 224, the piston 218 and track 216 can be raised to lift the workpiece out of the die or other portion of the machine M, as explained subsequently below. Where raising the workpiece is necessary for the same reason mentioned above, a similar arrangement is provided adjacent the opposite end of the work transfer apparatus 20 adjacent the machine M'. For simplicity of disclosure, the die D' of the machine M' is illustrated in FIGURES 1 and 2 as being of a type without a recess which would require raising and lowering of the workpiece W at that location.

The rearward end of the bracket 206 is also provided with an upstanding portion 228 which is drilled to slidably receive the rearward end of an adjusting screw 230 carrying lock nuts 231. The forward end of the screw 230 is threaded into the correspondingly drilled and threaded rearward boss 232 (FIGURES 5, 16 and 17) of a horizontally-adjustable circular cam, generally designated 234. The latter has an elongated slot 236 for the reception of the inner or solid shaft 196 while permitting forward and rearward sliding relatively thereto. The circular cam 234 rests upon the bracket 206 and its hub 204 and is provided with a circular cam groove 238 engaged by a roller 240 mounted on an axle bolt 242 (FIGURE 5) passing through the suitably drilled rearward end of a transverse rack bar 244. The latter is reciprocably mounted in a bore 246 in a hollow head 248 on the upper end of the solid shaft 196, which is annularly grooved as at 250 to receive a set screw 252 (FIGURE 4) by which the bracket 206 is secured to the inner shaft 196 while permitting relative rotation therebetween.

Communicating with the bore 246 in the hollow head 248 (FIGURE 5) is a recess 252 containing a pinion 254 meshing with the transverse rack bar 244. The pinion 254 is keyed to a longitudinal groove 256 (FIGURE 4) in a longitudinally slidable shaft 258 which thereby maintains a driving connection with the pinion 254 while slidable relatively thereto through the head 248, the shaft 258 being journaled in a bearing bushing 260 carried by the head 248.

Work gripping and positioning mechanism

The head 248 is provided with a bore 262 of rectangular cross-section (FIGURE 5) within which is slidably mounted a hollow beam 264 of rectangular cross-section which is longitudinally-slotted as at 266 (FIGURES 3 and 14) to receive one or more clamping bolts 268 by which it is adjustably secured to the head 248. Welded or otherwise secured to the forward end of the beam 264 (FIGURE 9) vertical plate 270. Also welded or otherwise secured to the opposite vertical sides of the plate 270 are two bearing sleeves 272 (FIGURES 8 and 10) arranged with their axes parallel to one another and slidably receiving two parallel rods 274. The rods 274 are urged forwardly by compression springs 269 encircling the reduced diameter portions 271 which pass loosely and slidably through guide arms 273 welded or otherwise secured to the opposite sides of the beam 264. The reduced diameter rods 274 are threaded at their rearward ends to receive stop nuts 275 (FIGURE 8). The rods 274 at their forward ends are secured to the transversely-extending ears 276 of a cross head, generally designated 278. The cross head 278 includes a hollow cylindrical bearing boss 280 (FIGURE 9) at the upper end of a vertical plate 282 from the opposite sides of which the ears 276 extend laterally in opposite directions (FIGURE 11), and from the rear of which an arm 284 extends longitudinally.

Rotatably mounted in the bore 286 of the bearing boss 280 is the hub 288 of a work-gripping device, generally designated 290, the hub 288 having a shelf 292 integral therewith and projecting forwardly therefrom (FIGURE 13). The shelf 292 is drilled and threaded at transversely-spaced locations to receive transversely-spaced bolts 294 which pass through and secure a rectangular jaw-supporting plate 296 to the upper face of the shelf 292. The shelf 292 is provided with a central longitudinal guide groove 298 of rectangular cross-section within which is slidably mounted a double wedge cam 300 (FIGURE 8) mounted on the outer or forward end of an operating rod or work-gripping device holding member 302 in such a manner that reciprocation of the rod 302 also reciprocates the double wedge cam 300 in the longitudinal guide groove 298, in order to operate the jaws of the work gripping device 290, as explained below.

Mounted on the rearward end of the rod 302 is an annularly-grooved shift collar 304, engaged on its opposite sides by the rounded inwardly-projecting upper ends 306 of a rocking H-lever 308 (FIGURE 10), the central cross bar 310 of which is pivotally and rockably mounted in a horizontal transverse bore 312 in the rearward end of the arm 284. From the cross bar 310, the H-lever 308 extends downward below the bearing sleeves 272 and terminates in lower ends 314. The upper and lower ends 306 and 314 of the H-lever 308 are arranged to be selectively and alternatively engaged by upper and lower forwardly-projecting pairs of stops 316 and 318 respectively (FIGURES 4 and 10) which project forwardly from the upper and lower corners respectively of a vertically-slidable rectangular plate 320 with which they are preferably integral. The plate 320 is provided with vertical slots 322 receiving screws or other fasteners 324 by which the plate 320 is slidably mounted upon the vertical plate 270 (FIGURE 9). The plate 270 is provided with an aperture 326 and the plate 320 with a cutaway portion 328 (FIGURES 9 and 10) for the passage of an extension of the shaft 258, as described below. The plate 320 (FIGURE 10) near its lower end is drilled to receive a pin 330 engaged by the slotted arm 332 of a bellcrank lever 334 pivotally mounted on a pivot pin 336 seated in the lower end of the plate 270. The round-ended other arm 338 of lever 334 slidably engages a longitudinal cam slot 340 with an oblique or bevelled end wall 342 formed in a combination cam and guide block, generally designated 344 (FIGURE 15).

The work-gripping device 290 is provided with a pair of work-gripping jaws 346 (FIGURES 8, 9, 11 and 13), the rearward ends 348, of which are drilled to receive pivot bolts 350 spaced laterally apart from one another and threaded into the underside of the rectangular jaw-supporting plate 296 (FIGURE 13). Forwardly of the rearward ends 348, the jaws 346 are provided with tongues 352 projecting inwardly toward one another (FIGURE 8) and drilled and threaded to receive the axle bolts 354 (FIGURE 12) of laterally-spaced contact rollers 356 engageable with the inclined converging opposite sides 358 of the double wedge cam 300 (FIGURE 8) immediately above the shelf 292. The jaws 346 immediately forward of the tongues 352 are drilled and threaded to receive the laterally-spaced grooved anchor pins 360 for the hooked opposite ends of a tension spring 362 which thereby urges the longitudinally-spaced pairs of work gripping lugs 364 into engagement with the opposite sides of the workpiece W (FIGURE 8). The lugs 364 project inwardly from wear plates 366 of which they are a part, the wear plates 366 being secured to the parallel forward end portions of the jaws 346 (FIGURE 9).

For rotating the work gripping device 290 in order to invert the workpiece W during its transfer from the machine M to the machine M', where this is necessary, the hub 288 thereof at its rearward end has a reduced diameter portion 370 to which is keyed or otherwise drivingly connected at 372 (FIGURES 9 and 11) an upper sprocket 374. The latter is drivingly connected by a sprocket chain 376 to a lower sprocket 378 which is pinned or otherwise drivingly connected to the reduced diameter forward end portion 380 of an extension shaft 384. Pinned to the forward end of the extension shaft 384 is a retaining collar 382. The extension shaft 384 passes rearwardly through the cutaway portion 328 and aperture 326 and is aligned with the shaft 258, and is connected thereto by a rotatably adjustable driving coupling, generally designated 386 (FIGURE 9). The coupling 386 has an outer sleeve 388 which is pinned or otherwise drivingly secured to the shaft 258 and which is annularly grooved externally as at 390 to receive a U-shaped shaft hanger 392 (FIGURE 14), the upper ends of which are welded or otherwise secured to the lower side of the beam 264.

The coupling sleeve 388 (FIGURE 9) is internally-grooved at 394 to rotatably receive a collar 396 which in turn is keyed to a keyway 398 extending longitudinally along the extension shaft 384. The collar 396 is clamped in any desired position of rotation relatively to the coupling sleeve 388 by a set screw 400 threaded through the coupling sleeve 388 into engagement with the collar 396. This coupling 386 enables the extension shaft 384 to be rotatably adjusted relatively to the shaft 258 in order to change the angle which the plane of the clamping jaws 346 makes with the horizontal, in order to adapt the jaws to the gripping of different shapes and inclinations of workpieces and dies.

The lower end of the vertical plate 282 of the cross head 278 (FIGURE 11) is bored transversely to receive an axle 402 upon the outer ends of which are mounted rollers 404 rotatably engaging an elongated guide groove 406 in the combination cam and guide block 344 (FIGURE 15), the latter being drilled vertically to receive bolts 408 (FIGURE 10) by which it is fixedly secured to the bed of the machine M adjacent the die half D. The forward end of the cam and guide block 344 is provided with an upstanding boss 410 which is drilled and threaded horizontally to receive a stop screw 412 (FIGURE 9) locked in position by a lock nut 414, the rearward end of the stop screw 412 engaging and halting the vertical plate 282 of the cross head 278. The guide slot 340 extends downwardly from the lower wall of the cam and guide block 344 at the bottom of the guide groove 406. The machine M' is similarly provided with a combination cam and guide block 416 of identical construction to the block 344 but of opposite hand and simularly secured to the bed of the machine M'.

*Operation*

In the operation of the work transfer apparatus 20 of the invention, for sake of simplicity let it be first assumed that the various valves (not shown) controlling the pneumatic circuit of the motors 126 and 222 are operated manually. The combination cam and guide blocks 344 and 416 are of course bolted or otherwise secured to the beds of the machines M and M' in their proper positions, i.e. in alignment with one another and the sockets 68 drilled in the beds B and B' to receive the locating pins 64 on the angle brackets 60 bolted to the opposite ends of the apparatus 20. Let it also be assumed that the apparatus 20 has been placed in position and located in this manner by inserting its locating pins 64 into the locating sockets 68 of the machines M and M'. Let it also be assumed that the reciprocatory motor 126 and the lifting motor 222 have been connected to a source of compressed air or other suitable pressure fluid by way of their service pipes 136, 138 and 224 (FIGURES 2 and 5), suitable conventional control valves being provided in the pneumatic circuit to reversibly control the supply of pressure fluid selectively to the service pipes 136 and 138 and to the service pipe 224.

Let it further be assumed that the forming or machining of a workpiece W has been completed in the die member D of the machine M and is to be transferred for subsequent machining operations to the die D' of the machine M'. If the workpiece is to be inverted or shifted angularly around the axis of the hub 288 of the work gripping device 290, the circular cam 234 is shifted from its centered position of FIGURE 17 to the decentered position of FIGURE 16 and locked in position by the lock nuts 231. Let it finally be assumed that the workpiece W has been loosened or dislodged from the die cavity of the die half D by the conventional stripping or ejecting mechanism customarily supplied with stamping presses of the type shown diagrammatically at M and M', so that the partially completed workpiece W is in a condition to be lifted out of the die cavity by the contact lugs 364 of the gripping jaws 346 (FIGURE 8) which are assumed to be in engagement with the rim of the workpiece W.

To transfer the workpiece W from the die D of the machine M to the die D' of the machine M' for further machining operations, if it is necessary to lift the workpiece W out of the die member D in order to clear the die cavity thereof, the operator supplies compressed air or other pressure fluid to the service pipe 224 at the lower end of the single-acting lifting cylinder 220 (FIGURE 5). This action forces the piston 218 upward in the cylinder 220, raising the stub track 216 and consequently lifting the inner shaft 196 and its head 248 and thus lifting the hollow beam 264 and the work-gripping device 290 carried thereby, thus lifting the workpiece W clear of the die cavity in the lower die member D of the machine M.

The operator then supplies compressed air or other pressure fluid to the service pipe 138 of the cylinder 128 of the reciprocatory fluid pressure motor 126. This action moves the piston rod 124 and rack bar 102 rearwardly (FIGURE 7), thereby rotating the pinion 100, the shaft 92 keyed thereto, and the cable drum 106 keyed to the shaft 92 in a clockwise direction. The consequent rearward pull on the upper course of the cable 110 as its lower course is wound upon the cable drum 106 forwardly of the rearward pulley 146 causes the work-carrying carriage 156 to move rearwardly along the tubular guide rail 52, rolling on its upper rollers 172 and guided by its lower rollers 180 and 182 engaging the inverted channel guide member 54 (FIGURE 5). While this is going on, air is released from the pipe 224 of the cylinder 220, causing the piston 218, 219 and stub track 216 to descend, thereby lowering the bracket 206 to its normal lowered traveling position of FIGURES 4 and 5 before its roller 214 runs off the stub track 216.

As the carriage 156 moves rearwardly to the right in FIGURES 1 and 2, the crank arm 184 by the engagement of its end rollers 192 and 194 with the opposite sides of the undulatory cam bar 78 swings the tubular shaft 164 in a counterclockwise direction when the rollers 192 and 194 traverse the hump or horizontal undulatory portion 82 (FIGURE 1). This action similarly rotates the inner vertical shaft 196 by its driving connection to the key block 200 with the slot 166 of the outer tubular shaft 164, swinging the head 248, the beam 264 and the work-gripping device 290 in a counterclockwise direction, i.e. out of the plane of the paper toward the observer in FIGURES 2 and 4. If the workpiece holding device 290 has been adjusted to invert the workpiece during transfer, by decentering its circular cam 234 from the centered position of FIGURE 17 to the decentered position of FIGURE 16, the consequent travel of the roller 240 (FIGURE 5) in the now decentered cam groove 238 causes reciprocation of the transverse rack bar 244 and consequent rotation of the pinion 254, shaft 258, extension shaft 384, sprockets 378 and 374, hub 288 and jaws 346, tilting or inverting the workpiece W, depending upon the amount of decentration imparted to the circular cam 234 relatively to the head 248.

After the rollers 192 and 194 pass the peak 84 of the hump 82 in the undulatory cam rod 78 and traverse the opposite or rearward side of the hump 82, the crank 184 which has previously been preceding the carriage 156 (FIGURES 2 and 4) now assumes a trailing position until it has been swung through a half revolution of 180°, thereby swinging the work gripping device 290 and beam 264 through a similar half revolution so as to present the jaws 346 and the workpiece W gripped thereby to the space in the machine M' immediately above its lower die member D'. It is, of course, assumed that the operation of the machines M and M' are so synchronized that the platens and upper die members thereof (not shown) are raised at the time work transfer is being effected, so as to avoid interference therewith.

As the work gripping device 290 nears the machine M', its rollers 404 enter the guide groove 406 of the combination guide and cam block 416 (FIGURE 1), the entrance to which has been flared (FIGURE 15) for further guidance. As the rollers 404 roll along the bottom of the guide groove 406, the rounded lower end 338 of the bellcrank lever 336 enters the guide slot 340 of the block 344, engaging the bevel portion 342 so as to swing the bellcrank lever 318 counterclockwise (FIGURE 10) around its pivot pin 336, thereby lowering the plate 320 and dropping its upper stops 316 into the path of the upper ends 306 of the H-lever 308.

As the work-gripping device 290 reaches the end of its travel in the cam and guide block 416 of the machine M', the vertical plate 282 of the cross head 278 encounters the end of the stop screw 412 (FIGURE 9) and halts the crosshead 278. The beam 264, however, continues to advance, carrying with it the plate 270 and the bellcrank lever 334 pivoted thereto, with the lower end 338 thereof sliding along the cam slot 340 after encountering the bevel portion 342 which swung it in the manner stated above. When the forward ends of the upper stops 316 encounter the upper ends 306 of the H-lever 308, they rock the lever 308 counterclockwise (FIGURE 9), pushing the rod 302 and double-wedge cam 300 forwardly to the left in FIGURES 8 and 9, spreading the rollers 356 and jaws 346 apart and releasing the grip of their gripping lugs 364 upon the workpiece.

As a consequence, the workpiece W drops into its proper place upon the die D', whereupon the operator reverses the control valve for the reciprocatory motor 126 to admit pressure fluid to the forward service pipe 136 and discharge it from the rearward service pipe 138. This causes a retraction of the rack bar 102 to the position shown in FIGURE 7, reversely rotating the pinion 100, shaft 92 and cable drum 106 so as to move the carriage 156 back from the machine M' to the machine M, reversing the foregoing operation. This mechanism enables the motion of the rack bar 102 to be multiplied, so that the carriage 156 travels much farther than the length of stroke of the rack bar 102. While the carriage 156 with the now empty work-gripping device 290 is moving back along the tubular guide rail 52, the machine M' has completed operations upon another workpiece and has loosened or ejected the workpiece by the time the work-gripping device 290 again reaches the extreme left-hand end of its path of travel while being swung in a 180° arc in the reverse direction to that previously described, so as to arrive again at the position shown in FIGURE 1.

While this is occurring, the inverting mechanism shown at the upper end of FIGURE 5 and in FIGURES 11, 16 and 17 has been operating automatically in the manner previously described to revert the workpiece holder 290 from its inverted position. As the carriage 156 reaches the left-hand limit of its travel shown in FIGURE 1, the stop screw 412 of the combination cam and guide block 344 again halts the work gripping device 290 while the continued advance of the beam 264 causes the bellcrank lever 334 to swing in the reverse direction from that described above, raising the plate 320 and placing its lower stops 318 in the path of the lower ends 314 of the H-lever 308. The subsequent encounter thereof, in the position shown in FIGURES 9 and 10, brought about by the continued advance of the beam 264 and plates 270 and 320 while the work gripping device 290 is held stationary by the stop screw 412 rocks the H-lever 306 clockwise in FIGURE 9 to pull the rod 302 and double-wedge cam 300 to the right into the retracted position shown in FIGURES 8 and 9. This action permits the spring 362 to pull the gripping jaws 346 toward one another, causing the gripping lugs 364 to engage the rim of the workpiece W, ready for a resumption of the forward stroke of the operating cycle described above.

If, meanwhile, the conditions have required raising of the work gripping device 290, as described above, by the action of the single-acting reciprocatory fluid pressure motor 222 (FIGURE 5) during the forward or work transfer stroke of the apparatus 20, the return stroke thereof requires a lowering of the work gripping device 290 in order for its gripping jaws 346 to be upon the proper plane for gripping the workpiece W to be transferred from the machine M on the next forward stroke. To accomplish this, the valve controlling the supply of pressure fluid to the motor 222 is reversed, so that fluid is withdrawn through the pipe 224, thereby permitting the piston rod 218 and stub track 216 to drop, permitting the inner shaft 196 and its head 248, beam 264 and work gripping device 290 carried thereby to descend to the positions shown in FIGURES 1 to 5 inclusive.

By a comparison of FIGURE 4, wherein the gripping jaws 346 are closed upon the workpiece W, and FIGURE 6, wherein they are open, as on the return stroke of the apparatus, the action of the upper and lower stops 316 and 318 in oppositely rocking the H-lever 306 to oppositely actuate the work gripping jaws 346 of the work gripping device 290 is readily perceived. While this is occurring, it will be seen that the rods 274 of the cross head 278 move back and forth in their respective bearing bosses 272, alternately compressing and relaxing the compression springs 269 which in turn actuate the double wedge cam 300 to operate the work gripping jaws 346.

*Electro-pneumatic control circuit and elements thereof*

To simplify the description of the construction and operation of the invention, the electro-pneumatic circuit of the work transfer apparatus 20 has been omitted and the various valves described as being manually operated. In actual installations of the apparatus, the various valves are operated by solenoids controlled by limit switches so as to automatically shift the valves at the proper locations and in the proper sequence. The electro-pneumatic circuit and valves necessary to accomplish this will be readily apparent to electrical engineers familiar with such electro-pneumatic machine-operating circuits from the following general description of a typical installation.

In such an installation, the service pipes 136 and 138 of the air cylinder 126 have been connected to a conventional solenoid-operated four-way air control valve, the energization of which is controlled by a first limit switch actuated by a cam on the platen of the machine M to release a first solenoid-operated safety stop (not shown) and to cause the carriage 156 to advance and the jaws 346 to grip the workpiece. The carriage 156 meanwhile has tripped a second limit switch which reverses the solenoid-operated air control valve, causing the carriage 156 to move to the right, tripping a third limit switch which actuates the work-gripping device 290 of a previous work transfer apparatus 20 to load a workpiece into the die D of the machine M.

As the carriage reaches the peak 84 of the hump 82 in the cam 78, it actuates a fourth limit switch which in turn operates a pressure reducing valve and closes a cushioning valve while the beam 264 is swinging the work gripping device 290 through an angle of 180°. The carriage 156 continues to travel to the right until it encounters a second solenoid-operated safety stop (not shown) and is halted thereby while the platen of machine M' completes its work upon the workpiece previously inserted therein on the previous stroke of the carriage 156 and, in rising, actuates a fifth limit switch similarly to the actuation of the first limit switch. This in turn actuates a third work transfer apparatus 20 located beyond the machine M' to remove the completed workpiece from the die D' thereof and release the second safety stop, whereupon the carriage 156 and work gripping device 290 move into the loading position for the die D'. This action moves the wedge cam 300 (FIGURE 8) to open the jaws 346 in response to the compression of the springs 269, releasing the workpiece to drop into the die D' of the machine M'.

At about this time, the carriage also trips a sixth limit switch located similarly to the second limit switch, reversing the air control valve to cause the reciprocatory motor 126 to move the carriage 156 to the left, tripping a seventh limit switch which starts the machine M' on its pressing stroke. As the carriage 156 in moving to the left passes the peak 84 of the hump 82 of the cam 78, it again trips the fourth limit switch, again operating the pressure reducing valve and closing the cushioning valve. Meanwhile, the beam 264 and the now empty work gripping device 290 swing back to the left through an angle of 180° to the positions shown in FIGURES 1, 2 and 8, and the carriage 156 is halted by the first solenoid-operated stop, ready to grip the next workpiece from the die D of the machine M and repeat the foregoing cycle.

What I claim is:

1. A work transfer apparatus for transferring workpieces from a first machine to a second machine, comprising a supporting framework adapted to be positioned between the machines, an elongated guideway mounted on said framework, a carriage mounted on said guideway for travel therealong between the machines, a pivot element pivotally mounted on said carriage for turning motion relatively thereto, a support element mounted on said pivot element for swinging motion therewith, said support element having a part mounted on said pivot element for axial movement relatively to said pivot element, a workpiece gripping device mounted on said support element, motive mechanism operatively connected to said carriage for moving said carriage along said guideway, means responsive to the travel of said carriage along said guideway for swinging said support element and workpiece gripping device relatively thereto from alignment with one machine into alignment with the other machine and means mounted at a predetermined location on said guideway for moving said support element part axially relatively to said pivot element, said axial moving means including a reciprocatory fluid pressure motor having a reciprocable piston operatively connected to said pivot element.

2. A work transfer apparatus for transferring workpieces from a first machine to a second machine, comprising a supporting framework adapted to be positioned between the machines, an elongated guideway mounted on said framework, a carriage mounted on said guideway for travel therealong between the machines, a pivot element pivotally mounted on said carriage for turning motion relatively thereto, a support element mounted on said pivot element for swinging motion therewith, said support element having a part mounted on said pivot element for axial movement relatively to said pivot element, a workpiece gripping device mounted on said support element, motive mechanism operatively connected to said carriage for moving said carriage along said guideway, means responsive to the travel of said carriage along said guideway for swinging said support element and workpiece gripping device relatively thereto from alignment with one machine into alignment with the other machine, and means responsive to the arrival of said carriage at a predetermined location on said guideway for moving said support element part axially relatively to said pivot element, said pivot element including a hollow pivot shaft and said support element including an inner shaft reciprocably mounted within said hollow shaft, a gripping device holding member mounted on said support element substantially perpendicular to and extending outwardly from said pivot element, said workpiece gripping device being mounted on said gripping device holding member, mechanism for rotating said gripping device holding member relatively to said pivot element on an axis of rotation substantially perpendicular to the pivot axis of said pivot element and means for actuating said gripping device holding member rotating mechanism in response to the swinging of said support element relatively to said pivot element.

3. A work transfer apparatus, according to claim 2, wherein said last-mentioned means includes a rotary pinion drivingly connected to said gripping device holding member and a reciprocable toothed rack meshing with said pinion and a cam reciprocatingly engaging said rack in response to the swing of said gripping device holding member relatively to said pivot element.

4. A work transfer apparatus, according to claim 3, wherein said cam is transversely movably mounted upon said pivot element for displacement into and out of centration with the pivot axis of said pivot element.

References Cited in the file of this patent

UNITED STATES PATENTS

| | | |
|---|---|---|
| 1,338,992 | Lott | May 4, 1920 |
| 1,958,846 | Christensen | May 15, 1934 |
| 2,040,028 | Smith et al. | May 5, 1936 |
| 2,154,992 | Pearson | Apr. 18, 1939 |
| 2,253,155 | Wadman | Aug. 19, 1941 |
| 2,268,075 | Langer | Dec. 30, 1941 |
| 2,574,473 | Getz et al. | Nov. 13, 1951 |